(12) United States Patent
Lee et al.

(10) Patent No.: US 9,776,306 B2
(45) Date of Patent: Oct. 3, 2017

(54) METHOD FOR MANUFACTURING AN ELECTRODEPOSITED DIAMOND WIRE SAW USING PATTERNED NON-CONDUCTIVE MATERIALS

(75) Inventors: Seh-Kwang Lee, Yongin-si (KR); Rak-Joo Sung, Hwaseong-si (KR); Sang-Wook Park, Seoul (KR)

(73) Assignee: EHWA DIAMOND INDUSTRIAL CO., LTD., Osan-Si, Gyeonggi-Do (KR)

( * ) Notice: Subject to any disclaimer, the term of this patent is extended or adjusted under 35 U.S.C. 154(b) by 826 days.

(21) Appl. No.: 14/009,879

(22) PCT Filed: Mar. 19, 2012

(86) PCT No.: PCT/KR2012/001943
§ 371 (c)(1),
(2), (4) Date: Dec. 6, 2013

(87) PCT Pub. No.: WO2012/138063
PCT Pub. Date: Oct. 11, 2012

(65) Prior Publication Data
US 2014/0246005 A1  Sep. 4, 2014

(30) Foreign Application Priority Data
Apr. 5, 2011 (KR) .......................... 10-2011-0031177

(51) Int. Cl.
*B24D 18/00* (2006.01)
*B23D 61/18* (2006.01)
(Continued)

(52) U.S. Cl.
CPC ....... *B24D 18/0018* (2013.01); *B23D 61/185* (2013.01); *B23D 65/00* (2013.01);
(Continued)

(58) Field of Classification Search
CPC ........ B24B 18/0018; B24B 18/00; B24B 4/06
(Continued)

(56) References Cited

U.S. PATENT DOCUMENTS 2,633,681 A * 4/1953 Sam ..................... B23D 61/185
125/18
3,886,926 A * 6/1975 Hall ..................... B23D 61/185
125/21
(Continued)

FOREIGN PATENT DOCUMENTS

CN 101073882 A 11/2007
JP 03202281 A 9/1991
(Continued)

OTHER PUBLICATIONS

Extended European Search Report dated Nov. 14, 2014.
(Continued)

*Primary Examiner* — Larry E Waggle, Jr.
*Assistant Examiner* — Lauren Beronja
(74) *Attorney, Agent, or Firm* — Hauptman Ham, LLP

(57) ABSTRACT

The present invention relates to an electrodeposited diamond wire saw using patterned non-conductive materials in which non-conductive materials are pre-patterned along the outer circumference of a wire on which diamond grit should not be rubbed, before the diamond grit is upset, in order to efficiently improve the manufacturing process, and to a method for manufacturing same. According to one preferred embodiment of the invention, the method for manufacturing an electrodeposited diamond wire saw includes: printing a masking solution on the outer circumference of a wire in a plurality of directions when the wire is inserted for patterning; and upsetting diamond grit on the remaining regions of the outer circumference of the wire, with the exception of the patterned region.

7 Claims, 4 Drawing Sheets

(51) Int. Cl.
  *B23D 65/00* (2006.01)
  *C25D 5/02* (2006.01)
  *B25D 13/00* (2006.01)
  *C25D 15/00* (2006.01)
  *C25D 13/00* (2006.01)
  *C25D 7/06* (2006.01)

(52) U.S. Cl.
  CPC ........... *C25D 5/022* (2013.01); *C25D 7/0607* (2013.01); *C25D 13/00* (2013.01); *C25D 15/00* (2013.01)

(58) Field of Classification Search
  USPC .......................... 51/309, 295, 307, 298, 293
  See application file for complete search history.

(56) References Cited

U.S. PATENT DOCUMENTS

| | | | | |
|---|---|---|---|---|
| 4,078,906 A | * | 3/1978 | Green | B24D 18/0018 51/295 |
| 5,066,312 A | * | 11/1991 | Ishak | B24D 3/002 51/295 |
| 5,374,293 A | * | 12/1994 | Takashita | B24D 18/0018 51/293 |
| 2001/0025457 A1 | | 10/2001 | Tselesin | |

FOREIGN PATENT DOCUMENTS

| | | |
|---|---|---|
| JP | 06063828 A | 3/1994 |
| JP | 07096454 A | 4/1995 |
| JP | 09254008 A | 9/1997 |
| JP | 2004358640 A | 12/2004 |
| JP | 2006231479 A | 9/2006 |
| JP | 2007038317 A | 2/2007 |
| JP | 2007203393 A | 8/2007 |
| JP | 2007324255 A | 12/2007 |
| JP | 2010-000584 A | 1/2010 |
| JP | 2012157908 A | 8/2012 |
| KR | 10-0340851 B1 | 1/1995 |
| KR | 10-0366466 B1 | 1/2001 |
| KR | 1020050014522 A | 2/2005 |
| KR | 1020110018642 A | 2/2011 |
| KR | 10-1121254 B1 | 3/2012 |
| WO | 2010141206 A2 | 12/2010 |

OTHER PUBLICATIONS

Japanese Notice of Allowance dated Feb. 3, 2015.
International Search Report for PCT/KR2012/001943, mailed Dec. 5, 2012.
Japanese Office Action dated Aug. 5, 2014.
Chinese Office Action dated Jun. 3, 2015.
James E. Duffy, "Automotive Repair After Collision", Training books for the Institute of Automotive Collision Repair (I-CAR), Beijing, China Machine Press, Dec. 1998, 16 pages.
Chinese Office Action dated Sep. 1, 2016 in connection with the counterpart Chinese Patent Application No. 201280017382.8.
Malaysian Office Action dated Jan. 13, 2017 in connection with the counterpart Malaysian Patent Application No. PI 2013003674.

* cited by examiner

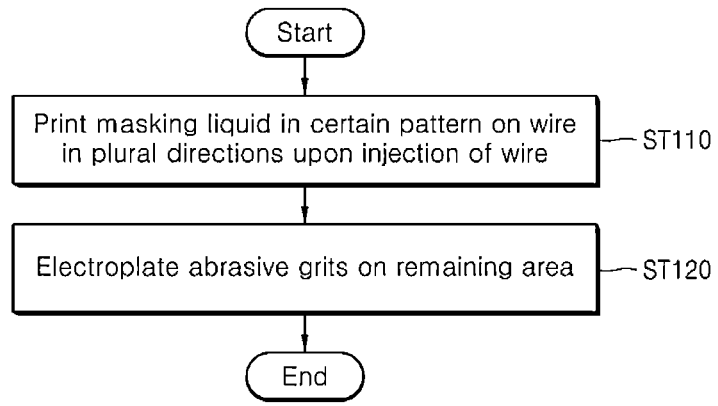
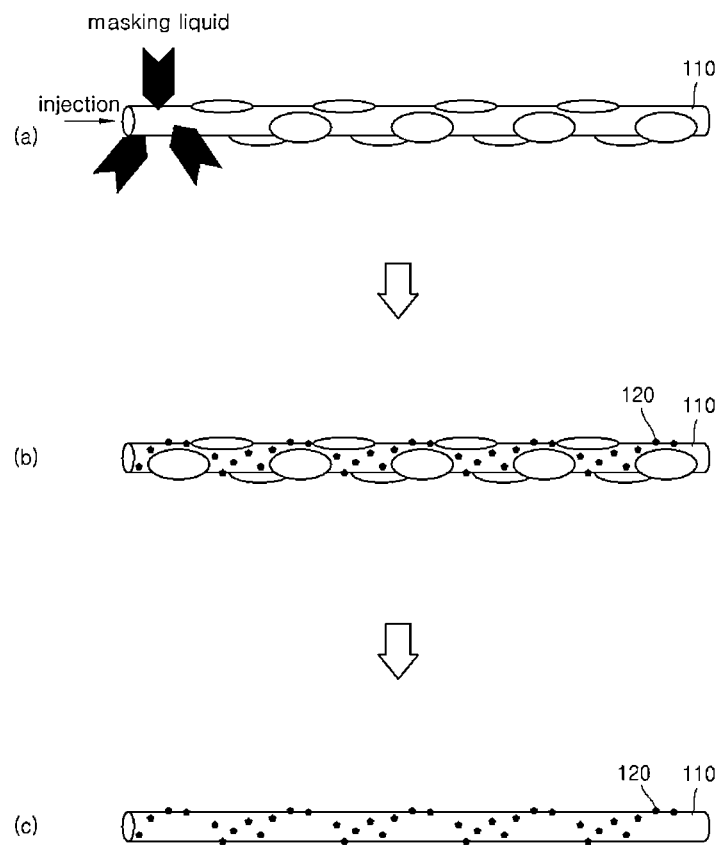

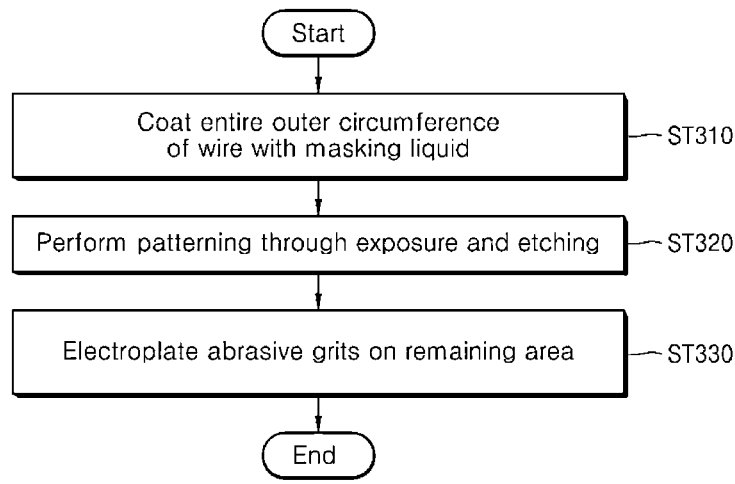
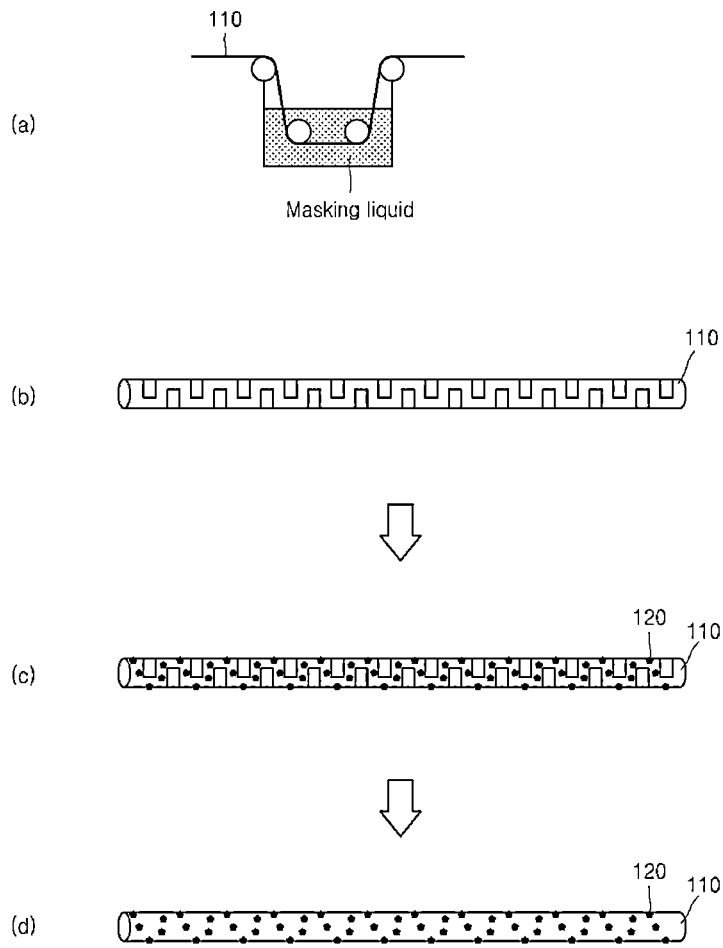

METHOD FOR MANUFACTURING AN ELECTRODEPOSITED DIAMOND WIRE SAW USING PATTERNED NON-CONDUCTIVE MATERIALS

TECHNICAL FIELD

The present invention relates to an electrodeposited diamond wire saw and a method for manufacturing the same using a patterning process of a non-conductive material, and more particularly, to technology capable of facilitating manufacture of a diamond wire saw used to cut silicon ingots, sapphire, and the like, into wafers, while reducing manufacturing costs and improving product quality.

BACKGROUND ART

Wire sawing is a process of cutting or grinding a silicon ingot, a sapphire wafer, and the like using a wire or a wire saw formed by forming a plurality of diamond grits on the wire.

The wire may be formed of high tensile strength metals, such as a steel wire, nickel wire, nichrome wire, and the like, and other materials may also be used.

The electrodeposited diamond wire saw is manufactured by electrodepositing diamond grits on an outer circumference of the wire in a longitudinal direction thereof.

However, since electrodeposition of the diamond grits in a desired pattern on the wire is difficult in manufacture of the wire saw, it is difficult to achieve process efficiency and uniform quality in mass production.

Thus, manufacturing costs of electrodeposited diamond wire saw are high and the process is labor intensive.

To this end, manufacturers have continually strived to develop methods of manufacturing electrodeposited diamond wire saws with improved process efficiency while reducing manufacturing costs. However, rational manufacturing methods have yet to be proposed in the art.

DISCLOSURE

Technical Problem

An aspect of the present invention is to provide an electrodeposited diamond wire saw and a manufacturing method thereof, in which electrodeposition of diamond grits is performed after patterning with a non-conductive material along an outer circumference of a wire, such that the diamond grits can be electrodeposited only on a section where the non-conductive material is not presented, thereby improving process efficiency and product quality while reducing manufacturing costs.

Another aspect of the present invention is to provide an electrodeposited diamond wire saw and a manufacturing method thereof, in which a wire is subjected to a patterning process by injecting a wire while ink-jetting a masking liquid in a plurality of directions, thereby facilitating electrodeposition of diamond grits.

A further aspect of the present invention is to provide an electrodeposited diamond wire saw and a manufacturing method thereof, in which patterning is performed by rotating a wire upon injecting the wire, while ink-jetting a masking liquid only in one direction, thereby facilitating electrodeposition of diamond grits.

Yet another aspect of the present invention is to provide an electrodeposited diamond wire saw and a manufacturing method thereof, in which patterning is performed by coating the entire surface of a wire with a non-conductive material, and then performing exposure and etching processes upon the non-conductive material, thereby facilitating electrodeposition of diamond grits.

Yet another aspect of the present invention is to provide an electrodeposited diamond wire saw and a manufacturing method thereof, in which patterning is performed by attaching a non-conductive tape having perforated holes to a wire only in a certain section of the wire, on which diamond grits will be electrodeposited, thereby facilitating electrodeposition of diamond grits.

Technical Solution

In accordance with one aspect of the present invention, a method for manufacturing an electrodeposited diamond wire saw includes: (a) performing a patterning process by printing a masking liquid on an outer circumference of a wire in a plurality of directions upon injection of the wire; and (b) electrodepositing diamond grits onto a remaining area of the outer circumference of the wire excluding an area upon which the patterning process has been performed.

In operation (a), the masking liquid may be printed by arranging a plurality of printing nozzles at the same included angle with respect to the outer circumference of the wire, and printing the masking liquid along a predetermined patterning pathway on the outer circumference of the wire.

The masking liquid may be printed by an inkjet method.

In operation (b), the remaining area of the outer circumference of the wire, which has been electrodeposited with the diamond grits, may have a spiral shape in a longitudinal direction of the wire.

In accordance with another aspect of the present invention, a method for manufacturing an electrodeposited diamond wire saw includes: (a) performing a patterning process by printing a masking liquid on an outer circumference of a wire in one direction while rotating the wire upon injection of the wire; and (b) electrodepositing diamond grits onto a remaining area of the outer circumference of the wire excluding an area upon which the patterning process has been performed.

In operation (a), the masking liquid may be printed by arranging a single printing nozzle to be separated from the outer circumference of the wire, and adjusting a printing cycle of the printing nozzle to allow the masking liquid to be printed along a predetermined patterning pathway on the outer circumference of the wire rotated while being injected.

In accordance with a further aspect of the present invention, a method for manufacturing an electrodeposited diamond wire saw includes: (a) coating a masking liquid over an entire outer circumference of a wire; (b) performing a patterning process by applying exposure and etching to the wire entirely coated with the making liquid in a predetermined pattern; and (c) electrodepositing diamond grits onto a remaining area of the outer circumference of the wire excluding an area upon which the patterning process has been performed.

In operation (b), exposure may be performed via ultraviolet (UV) irradiation.

In accordance with yet another aspect of the present invention, a method for manufacturing an electrodeposited diamond wire saw includes: (a) performing a patterning process by attaching a masking tape in a predetermined pattern along an outer circumference of a wire; (b) electrodepositing diamond grits onto a remaining area of the outer circumference of the wire excluding an area upon which the patterning process has been performed; and (c) removing the masking tape from the wire.

In operation (a), the performing a patterning process may include arranging a plurality of perforated holes on the masking tape in a spiral arrangement in a longitudinal direction of the wire, and attaching the masking tape having the perforated holes to the outer circumference of the wire.

In operation (a), the patterning process may include attaching the masking tape to the outer circumference of the wire in a spiral arrangement in a longitudinal direction of the wire.

In accordance with yet another aspect of the invention, there is provided an electrodeposited diamond wire saw, wherein a non-conductive material is formed in a predetermined pattern over a certain area of an outer circumference of a wire, and diamond grits are electrodeposited onto a remaining area of the outer circumference of the wire.

The non-conductive material may be formed in a spiral arrangement in a longitudinal direction of the wire.

The diamond grits may be disposed in a spiral arrangement in a longitudinal direction of the wire.

Advantageous Effects

In the electrodeposited diamond wire saw and the manufacturing method thereof according to the present invention, patterning with a non-conductive material is performed at desired sections along an outer circumference of a wire prior to electrodeposition of diamond grits upon the wire, thereby improving product competitiveness through improvement in process efficiency and product quality while reducing manufacturing costs.

In particular, four exemplary embodiments of the patterning process for the non-conductive material are as follows.

In a first embodiment, patterning is performed by injecting a wire while ink-jetting a masking liquid in a plurality of directions, followed by electrodeposition of diamond grits.

In a second embodiment, patterning is performed by rotating a wire upon injecting the wire while ink-jetting a masking liquid only in one direction, followed by electrodeposition of diamond grits.

In a third embodiment, patterning is performed by coating the entire surface of a wire with a non-conductive material and then performing exposure and etching processes upon the non-conductive material, followed by electrodeposition of diamond grits.

In a fourth embodiment, patterning is performed by attaching a non-conductive tape having perforated holes to a wire only in a certain section of the wire, on which diamond grits will be electrodeposited, followed by electrodeposition of diamond grits.

Accordingly, manufacture of the electrodeposited diamond wire saw can be automated, thereby enabling labor and cost reduction, and mass production of products with improved quality.

DESCRIPTION OF DRAWINGS

FIG. 1 is a flowchart of a method for manufacturing an electrodeposited diamond wire saw through patterning of a non-conductive material according to a first embodiment of the invention.

FIG. 2 is a process view explaining the method for manufacturing an electrodeposited diamond wire saw through patterning of the non-conductive material according to the first embodiment of the invention.

FIG. 5 is a flowchart of a method for manufacturing an electrodeposited diamond wire saw through patterning of a non-conductive material according to a third embodiment of the invention.

FIG. 6 is a process view explaining the method for manufacturing an electrodeposited diamond wire saw through patterning of the non-conductive material according to the third embodiment of the invention.

BEST MODE

Figure 3:
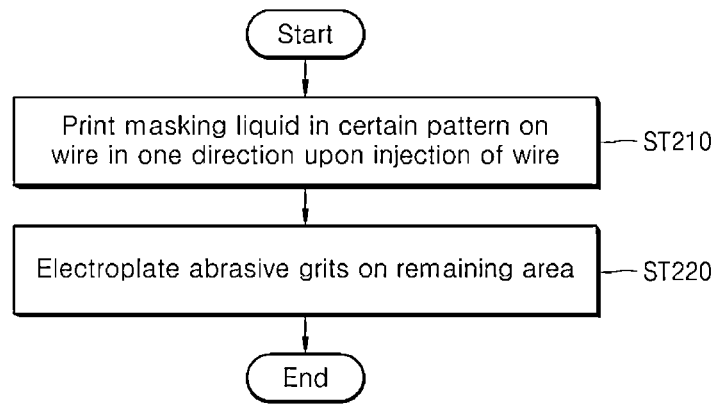
FIG. 3 is a flowchart of a method for manufacturing an electrodeposited diamond wire saw through patterning of a non-conductive material according to a second embodiment of the invention.

The above and other aspects, features, and advantages of the present invention will become apparent from the detailed description of the following embodiments in conjunction with the accompanying drawings. It should be understood that the present invention is not limited to the following embodiments and may be embodied in different ways, and that the embodiments are provided for complete disclosure and a thorough understanding of the present invention by those skilled in the art. The scope of the present invention will be defined only by the claims. In addition, descriptions of details apparent to those skilled in the art will be omitted for clarity.

Prior to descriptions of four exemplary embodiments of a method for manufacturing an electrodeposited diamond wire saw according to the present invention, a general structure of the wire saw will be described.

Wire sawing is performed using a wire saw to cut and grind various metal objects such as aluminum (Al), copper (Cu), gold (Au), silver (Ag), etc. Recently, wire sawing has been applied to chip packages, plastics, resin molded articles, and the like.

The wire saw includes a high tensile strength wire and abrasive grits electrodeposited along an outer circumference of the wire.

The wire may be a steel wire, a nickel wire, a nichrome wire, or the like, and the abrasive grits may be made of diamond, silicon carbide (SiC), and the like, which exhibit excellent properties in terms of hardness and cuttability.

In particular, a wire saw formed by electrodepositing diamond grits on a wire is called an electrodeposited diamond wire saw. Electrodeposited diamond wire saws have recently applied to semiconductor cutting operation, such as silicon ingot cutting, sapphire wafer cutting, and the like.

Four exemplary embodiments of manufacturing an electrodeposited diamond wire saw according to the present invention will be described hereinafter.

Embodiment 1

FIG. 1 is a flowchart of a method for manufacturing an electrodeposited diamond wire saw through patterning of a non-conductive material according to a first embodiment of the invention. FIG. 2 is a process view explaining the method for manufacturing an electrodeposited diamond wire saw through patterning of the non-conductive material according to the first embodiment of the invention.

FIG. 2 is a schematic diagram of the method for manufacturing an electrodeposited diamond wire saw according to the first embodiment of the invention, which will be described with reference to FIG. 1. Thus, FIG. 2 will also be referred to in description of the first embodiment shown in FIG. 1.

First, the method according to the first embodiment will be described with reference to FIG. 1.

Patterning (ST110)

In this operation (ST110), a masking liquid is printed in a predetermined pattern on an outer circumference of a wire for efficiency of electrodeposition, before electrodeposition of diamond grits on the surface of the wire, i.e., on the outer circumference thereof.

Referring to (a) of FIG. 2, this operation is illustrated in more detail.

As shown therein, the masking liquid is sprayed and printed in a plurality of directions (e.g., three directions in FIG. 2) on the outer circumference of the wire 110 injected in one direction.

For more effective printing of the masking liquid, a plurality of printing nozzles (not shown) may be used.

The printing nozzles are configured to inkjet-print the masking liquid on the outer circumference of the wire, and may have any typical inkjet nozzle structure.

The plurality of printing nozzles may be arranged at the same included angle on the outer circumference of the wire 110. As shown therein, three printing nozzles may be arranged at an included angle of 120°. However, it should be understood that the present invention is not limited thereto.

The masking liquid is sequentially sprayed from three printing nozzles and printed along the outer circumference of the wire 110 injected linearly, thereby completing the patterning process upon the outer circumference of the wire.

Here, a patterning pathway may be designed by a user prior to implementation of the manufacturing process. Further, the patterning pathway may be altered depending upon target shapes of the electrodeposited diamond wire saw to be manufactured.

Through this operation (ST110), the masking liquid is patterned upon all sections of the outer circumference of the wire excluding an area where the diamond grits will be electrodeposited in a subsequent operation described hereinafter.

Electrodeposition of Diamond Grits (ST120)

In this operation (ST120), diamond grits are electrodeposited along the outer circumference of the wire excluding the section subjected to patterning in the previous operation.

The diamond grits may be electrodeposited by attaching the diamond grits dispersed in a nickel plating solution to the wire in the case where the wire is electroplated with nickel. Alternatively, other methods for electrodepositing diamond grits may be employed.

Referring to (b) of FIG. 2, this operation is illustrated in more detail.

As shown therein, the process of patterning with the masking liquid is performed upon the outer circumference of the wire 110 excluding the section where the diamond grits 120 will be electrodeposited.

Here, a remaining area on the outer circumference of the wire 110, where the diamond grits 120 will be electrodeposited, that is, an area which is not subjected to the patterning process in the previous operation (ST110), has a continuous spiral shape in the longitudinal direction of the wire 110.

As the diamond grits 120 are uniformly electrodeposited throughout this area, the electrodeposited diamond wire saw manufactured by this method may exhibit uniform cutting and grinding capabilities over the whole length.

As shown in (c) of FIG. 2, the electrodeposited diamond wire saw manufactured by the method of the first embodiment includes the diamond grits electrodeposited on the wire in a uniform and precise spiral arrangement.

Further, the overall process can be systematically managed, thereby providing products with uniform and high quality.

As described above with reference to FIGS. 1 and 2, the method according to the first embodiment includes only two operations for manufacture of the electrodeposited diamond wire saw, thereby enabling efficient management of the manufacturing process, reducing costs, and decreasing labor demands.

Embodiment 2

Figure 4:
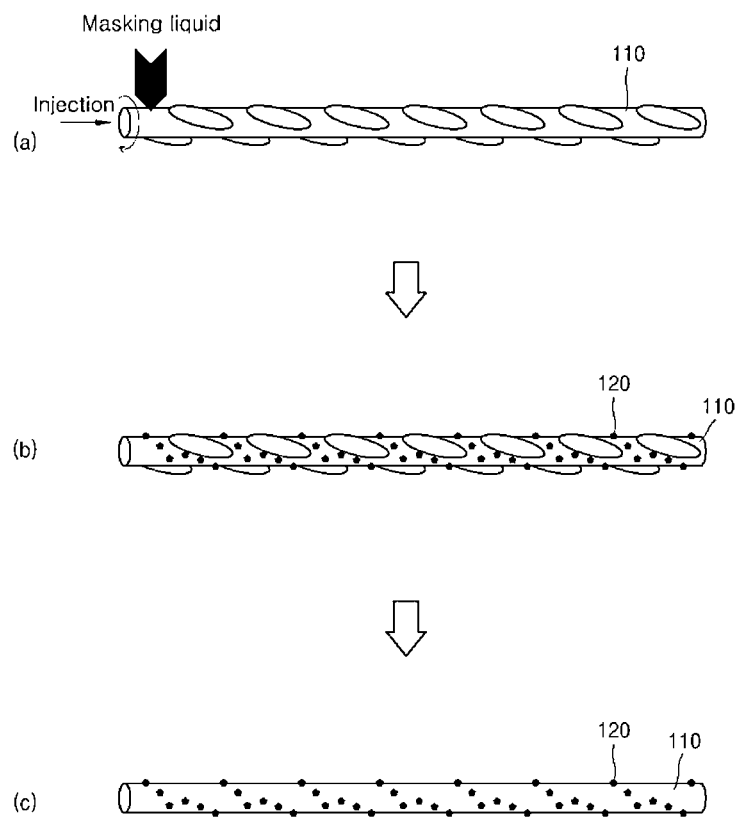
FIG. 4 is a process view explaining the method for manufacturing an electrodeposited diamond wire saw through patterning of the non-conductive material according to the second embodiment of the invention.

FIG. 3 is a flowchart of a method for manufacturing an electrodeposited diamond wire saw through patterning of a non-conductive material according to a second embodiment of the invention. FIG. 4 is a process view explaining the method for manufacturing an electrodeposited diamond wire saw through patterning of the non-conductive material according to the second embodiment of the invention.

FIG. 4 is a schematic diagram of the method for manufacturing an electrodeposited diamond wire saw according to the second embodiment of the invention, which will be described with reference to FIG. 3. Thus, FIG. 4 will also be referred to in description of the second embodiment shown in FIG. 3.

First, the method according to the second embodiment will be described with reference to FIG. 3.

Patterning (ST210)

In this operation (ST210), a masking liquid is printed in a predetermined pattern on an outer circumference of a wire for efficiency of electrodeposition, before electrodeposition of diamond grits on the surface of the wire, i.e., on the outer circumference thereof.

In comparison with the patterning operation (ST110) described with reference to FIG. 1, in which the wire of the first embodiment is injected linearly, the wire according to the second embodiment is rotated upon injection of the wire.

Further, the second embodiment is different from the first embodiment in that the masking liquid is unidirectionally printed on the outer circumference of the wire, which is rotated while being injected.

Referring to (a) of FIG. 4, this operation is illustrated in more detail.

As shown therein, the wire 110 is rotated while being injected in one direction.

The masking liquid is unidirectionally sprayed and printed on the outer circumference of the rotating wire 110.

In this operation, a printing nozzle may also be used for more effective printing of the masking liquid and inkjet printing may be used as in the first embodiment.

The masking liquid may be sprayed and printed from the printing nozzle disposed at one side of the outer circumference of the wire 110 rotated while being injected. To print the masking liquid along a predetermined patterning pathway, a printing cycle of the printing nozzle may be controlled.

That is, a spraying cycle of the masking liquid sprayed from the printing nozzle may be adjusted in accordance with an injection speed and a rotating speed of the wire 110.

As a result, the masking liquid is printed on the outer circumference of the wire along the patterning pathway set by a user.

Here, the patterning pathway set by a user may be slightly changed depending upon a target shape of the electrodeposited diamond wire saw to be manufactured.

Through this operation (ST210), the masking liquid is patterned upon all sections of the outer circumference of the wire excluding an area where the diamond grits will be electrodeposited in a subsequent operation described hereinafter.

Electrodeposition of Diamond Grits (ST220)

In this operation (ST220), diamond grits are electrodeposited along the outer circumference of the wire excluding the section subjected to patterning in the previous operation.

Referring to (b) of FIG. 4, this operation is illustrated in more detail.

As shown therein, the process of patterning with the masking liquid is performed upon the outer circumference of the wire 110 excluding the section where the diamond grits 120 will be electrodeposited.

Here, a remaining area on the outer circumference of the wire 110, where the diamond grits 120 will be electrodeposited, that is, an area which is not subjected to the patterning process in the previous operation (ST210), has a continuous spiral shape in the longitudinal direction of the wire 110.

As the diamond grits 120 are uniformly electrodeposited over this area, the electrodeposited diamond wire saw manufactured by this method may exhibit uniform cutting and grinding capabilities over the whole length.

This operation (ST220) may be performed equally or similarly to the operation of electrodepositing diamond grits (ST120) in the method according to the first embodiment described with reference to FIG. 1.

The method according to the second embodiment also includes only two operations for manufacture of the electrodeposited diamond wire saw, thereby enabling efficient management of the manufacturing process, reducing costs, and decreasing labor demands.

Embodiment 3

FIG. 5 is a flowchart of a method for manufacturing an electrodeposited diamond wire saw through patterning of a non-conductive material according to a third embodiment of the invention. FIG. 6 is a process view explaining the method for manufacturing an electrodeposited diamond wire saw through patterning of the non-conductive material according to the third embodiment of the invention.

FIG. 6 is a schematic diagram of the method for manufacturing an electrodeposited diamond wire saw according to the third embodiment of the invention, which will be described with reference to FIG. 5. Thus, FIG. 6 will also be referred to in description of the third embodiment shown in FIG. 5.

First, the method according to the third embodiment will be described with reference to FIG. 5.

Coating Overall Surface with Masking Liquid (ST310)

In this operation (ST310), the overall outer circumference of the wire is coated with the masking liquid.

This operation of coating the overall outer circumference of the wire with the masking liquid is a preceding process for patterning the masking liquid on the outer circumference of the wire by a photomasking technology of the following operation.

Referring to (a) of FIG. 6, a process of coating the overall outer circumference of the wire 110 with the masking liquid is illustrated.

As shown therein, the entering wire 110 passes through a container filled with the masking liquid, such that the overall outer circumference of the wire 110 can be coated with the masking liquid. The coating method shown in (a) of FIG. 6 is illustrated as an exemplary embodiment and the present invention is not limited thereto.

Patterning (ST320)

In this operation (ST320), patterning is performed by applying exposure and etching to the wire 110, which has been coated with the masking liquid in the previous operation, in a predetermined pattern.

In this operation, the method of forming a predetermined pattern on the outer circumference of the wire 110 by exposing and etching to the wire 110 entirely coated with the masking liquid in a predetermined pattern is equal or similar to photomasking. Photomasking is a well-known process in manufacture of semiconductor devices and liquid crystal displays (LCD), and a detailed description thereof will be omitted.

In this operation, exposure may be performed via ultraviolet (UV) irradiation. When etching is performed after exposure is applied in a predetermined pattern, the outer circumference of the wire is patterned.

By this operation, the masking liquid can be partially printed in a predetermined pattern on the outer circumference of the wire, as shown in (b) of FIG. 6.

As shown therein, a plurality of rectangular shapes is alternately formed with a regular spacing therebetween in horizontal and vertical directions. However, it should be understood that the predetermined invention is not limited thereto.

Electrodeposition of Diamond Grits (ST330)

In this operation (ST320), diamond grits are electrodeposited along the outer circumference of the wire excluding the section subjected to patterning in the previous operation Referring to (c) of FIG. 6, the diamond grits 120 are electrodeposited on the section excluding an area coated with the non-conductive material remaining after the exposure and etching.

That is, the diamond grits 120 may be uniformly electrodeposited over a remaining area on the outer circumference of the wire 110, excluding the section coated with the masking liquid.

Here, the remaining area on the outer circumference of the wire 110, where the diamond grits 120 will be electrodeposited, has a continuous spiral shape in the longitudinal direction of the wire 110.

As the diamond grits 120 are uniformly electrodeposited over the outer circumference of the wire 110, the electrodeposited diamond wire saw manufactured by this method may exhibit uniform cutting and grinding capabilities over the whole length.

Here, this operation (ST330) may be performed equally or similarly to the operation of electrodepositing diamond grits (ST120, ST220) in the method according to the first and second embodiments described with reference to FIGS. 1 and 3.

Embodiment 4

Figure 7:
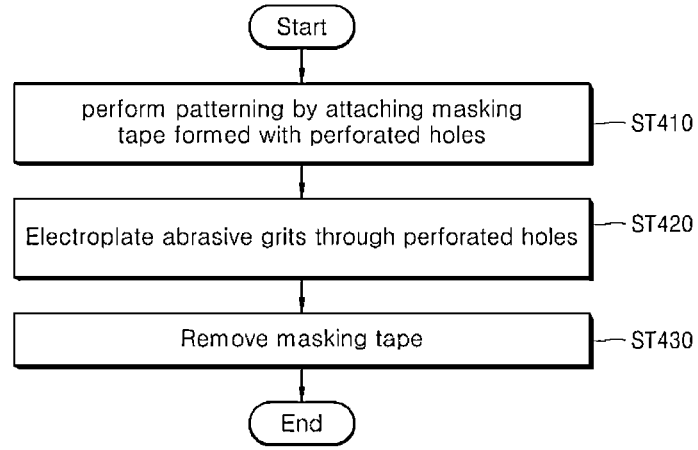
FIG. 7 is a flowchart of a method for manufacturing an electrodeposited diamond wire saw through patterning of a non-conductive material according to a fourth embodiment of the invention.
Figure 8:
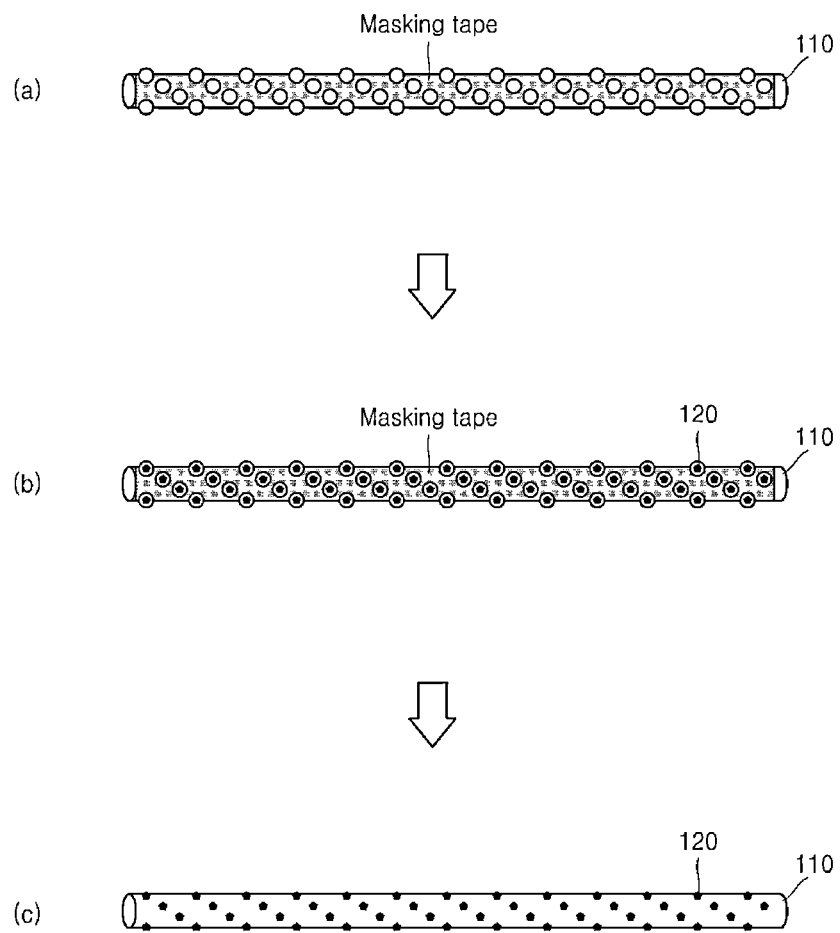
FIG. 8 is a process view explaining the method for manufacturing an electrodeposited diamond wire saw through patterning of the non-conductive material according to the fourth embodiment of the invention.

FIG. 7 is a flowchart of a method for manufacturing an electrodeposited diamond wire saw through patterning of a non-conductive material according to a fourth embodiment of the invention. FIG. 8 is a process view explaining the method for manufacturing an electrodeposited diamond wire saw through patterning of the non-conductive material according to the fourth embodiment of the invention.

FIG. 8 is a schematic diagram of the method for manufacturing an electrodeposited diamond wire saw according to the fourth embodiment of the invention, which will be described with reference to FIG. 7. Thus, FIG. 8 will also be referred to in description of the fourth embodiment shown in FIG. 7.

First, operations of the fourth exemplary embodiment will be described with reference to FIG. 7.

Patterning Using Masking Tape (ST410)

In this operation (ST410), a non-conductive material is printed in a predetermined pattern on a wire by attaching a masking tape to an outer circumference of the wire.

The patterning method in this operation is different from those of the first, second and third embodiments.

That is, instead of the masking liquid, a prefabricated masking tape is used as the non-conductive material. The masking tape is wound around and attached to the outer circumference of the wire in order to print the non-conductive material in a predetermined pattern.

This operation (ST410) may be performed by the following two methods.

In one method, as shown in (a) of FIG. 8, the masking tape formed with a plurality of perforated holes is wound around and directly attached to a section, where the diamond grits will be electrodeposited, in the longitudinal direction of the wire 110.

In this case, the plurality of perforated holes may be disposed in a spiral arrangement on the masking tape. Diamond grits 120 may be electrodeposited through the plurality of holes.

In another method, although not shown in the drawings, the masking tape is spirally wound around the outer circumference of the wire excluding an area where the diamond grits will be electrodeposited.

In this case, there is no need for the perforated holes on the masking tape.

That is, when the masking tape is attached, a predetermined gap is left between regions wound by the masking tape such that the diamond grits can be uniformly electrodeposited within the gap.

Electrodeposition of Diamond Grits (ST420)

In this operation (ST420), diamond grits are electrodeposited along the outer circumference of the wire through the perforated holes, or through the gap formed in the case where patterning is performed by attaching the masking tape.

Referring to (b) of FIG. 8, the diamond grits 120 are electrodeposited within a plurality of perforated holes disposed in a spiral arrangement on the masking tape.

Removal of Masking Tape (ST430)

This operation (ST430) is a finishing operation to remove the masking tape from the wire after the diamond grits are electrodeposited in the spiral arrangement along the outer circumference of the wire through the foregoing operations (ST410, ST420).

Referring to (c) of FIG. 8, the diamond grits 120 are regularly electrodeposited in a continuous spiral arrangement on the outer circumference of the wire 110 in the longitudinal direction thereof.

The electrodeposited diamond wire saw manufactured by this method may exhibit uniform cutting and grinding capabilities over the whole length.

As described above, in the electrodeposited diamond wire saw and the manufacturing method according to the present invention, patterning with a non-conductive material is performed at desired sections along an outer circumference of a wire, from which electrodeposition of diamond grits has to be excluded, prior to electrodeposition of the diamond grits onto the wire.

As a result, the electrodeposited diamond wire saw and the manufacturing method according to the present invention may improve product competitiveness through improvement in process efficiency and product quality while reducing manufacturing costs.

In particular, the present invention provides four exemplary embodiments of the process for patterning with the non-conductive material.

In the first embodiment, patterning is performed by injecting a wire while ink-jetting a masking liquid in a plurality of directions, followed by electrodeposition of diamond grits.

In the second embodiment, patterning is performed by rotating a wire upon injecting the wire while ink-jetting a masking liquid only in one direction, followed by electrodeposition of diamond grits.

In the third embodiment, patterning is performed by coating the entire surface of a wire with a non-conductive material and then performing exposure and etching processes upon the non-conductive material, followed by electrodeposition of diamond grits.

In the fourth embodiment, patterning is performed by attaching a non-conductive tape having perforated holes to a wire only in a certain section of the wire, on which diamond grits will be electrodeposited, followed by electrodeposition of the diamond grits.

Accordingly, manufacture of the electrodeposited diamond wire saw can be automated, thereby enabling labor and cost reduction, and mass production of products with improved quality.

Although some embodiments of the electrodeposited abrasive particle wire saw with improved durability and cuttability have been disclosed, it should be understood that the present invention is not limited thereto. Alternatively, various modifications can be made without departing from the scope of the present invention.

That is, it will be understood by those skilled in the art that these embodiments are provided for illustration only and various modifications, changes, alterations and equivalent embodiments can be made without departing from the scope of the present invention. Therefore, the scope and sprit of the invention should be defined only by the accompanying claims and equivalents thereof.

The invention claimed is:

1. A method for manufacturing an electrodeposited diamond wire saw, the method comprising:
    (a) performing a patterning process by printing a masking liquid on an outer circumference of a wire by spraying the masking liquid in a plurality of directions upon injection of the wire; and
    (b) electrodepositing diamond grits onto a remaining area of the outer circumference of the wire excluding an area upon which the patterning process has been performed,
    wherein, in operation (a), the masking liquid is printed by arranging a plurality of printing nozzles at the same included angle with respect to the outer circumference of the wire, and printing the masking liquid along a predetermined patterning pathway by spraying a masking liquid on the outer circumference of the wire, and wherein, in operation (b), the remaining area of the outer circumference of the wire, which has been electrodeposited with the diamond grits, has a spiral shape in a longitudinal direction of the wire.

2. The method according to claim 1, wherein the masking liquid is printed by an inkjet method.

3. A method for manufacturing an electrodeposited diamond wire saw, the method comprising:
(a) performing a patterning process by printing a masking liquid on an outer circumference of a wire by spraying the masking liquid in one direction while rotating the wire upon injection of the wire; and
(b) electrodepositing diamond grits onto a remaining area of the outer circumference of the wire excluding an area upon which the patterning process has been performed,
wherein, in operation (a), the masking liquid is printed by arranging a single printing nozzle to be separated from the outer circumference of the wire, and adjusting a printing cycle of the printing nozzle to allow the masking liquid to be printed along a predetermined patterning pathway after spraying the masking liquid on the outer circumference of the wire rotated while being injected, and
wherein, in operation (b), the remaining area on the outer circumference of the wire, which has been electrodeposited with the diamond grits, has a spiral shape in a longitudinal direction of the wire.

4. The method according to claim 3, wherein the masking liquid is printed by an inkjet method.

5. A method for manufacturing an electrodeposited diamond wire saw, the method comprising:
(a) coating a masking liquid over an entire outer circumference of a wire;
(b) performing a patterning process by applying exposure and etching to the wire entirely coated with the making liquid in a predetermined pattern; and
(c) electrodepositing diamond grits onto a remaining area of the outer circumference of the wire excluding an area upon which the patterning process has been performed,
wherein, in operation (b), exposure is performed via ultraviolet (UV) irradiation, and
wherein, in operation (c), the remaining area on the outer circumference of the wire, which has been electrodeposited with the diamond grits, has a spiral shape in a longitudinal direction of the wire.

6. A method for manufacturing an electrodeposited diamond wire saw, the method comprising:
(a) performing a patterning process by attaching a masking tape in a predetermined pattern along an outer circumference of a wire;
(b) electrodepositing diamond grits onto a remaining area of the outer circumference of the wire excluding an area upon which the patterning process has been performed; and
(c) removing the masking tape from the wire,
wherein, in operation (a), the performing a patterning process comprises:
arranging a plurality of perforated holes on the masking tape in a spiral arrangement in a longitudinal direction of the wire; and
attaching the masking tape having the perforated holes to the outer circumference of the wire.

7. A method for manufacturing an electrodeposited diamond wire saw, the method comprising:
(a) performing a patterning process by attaching a masking tape in a predetermined pattern along an outer circumference of a wire;
(b) electrodepositing diamond grits onto a remaining area of the outer circumference of the wire excluding an area upon which the patterning process has been performed; and
(c) removing the masking tape from the wire,
wherein, in operation (a), the patterning process comprises attaching the masking tape to the outer circumference of the wire in a spiral arrangement in a longitudinal direction of the wire.

* * * * *